US012489299B2

(12) United States Patent
Evans et al.

(10) Patent No.: US 12,489,299 B2
(45) Date of Patent: Dec. 2, 2025

(54) CONFIGURABLE CURRENT STEERING IN A PRINTED CIRCUIT BOARD

(71) Applicant: LENOVO ENTERPRISE SOLUTIONS (SINGAPORE) PTE LTD., Singapore (SG)

(72) Inventors: Douglas Evans, Morrisville, NC (US); Robert R. Wolford, Strongsville, OH (US); Brian C. Totten, Morrisville, NC (US); Jose I. Rojas, Morrisville, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 20 days.

(21) Appl. No.: 18/484,082

(22) Filed: Oct. 10, 2023

(65) Prior Publication Data

US 2025/0118971 A1   Apr. 10, 2025

(51) Int. Cl.
*H02J 3/46* (2006.01)
*H02B 1/20* (2006.01)

(52) U.S. Cl.
CPC . *H02J 3/46* (2013.01); *H02B 1/20* (2013.01)

(58) Field of Classification Search
CPC .................................. H02J 3/46; H02B 1/20
USPC ......................................................... 307/18
See application file for complete search history.

(56) References Cited

U.S. PATENT DOCUMENTS

| 7,406,623 B2* | 7/2008 | Takahashi | H02J 9/061 |
| | | | 714/22 |
| 8,080,900 B2* | 12/2011 | Corhodzic | H02M 3/335 |
| | | | 307/64 |
| 8,738,268 B2* | 5/2014 | Karimi | H02J 3/38 |
| | | | 700/286 |
| 9,525,285 B2* | 12/2016 | Johnson | H02J 7/0068 |
| 2004/0000815 A1* | 1/2004 | Pereira | H05K 7/1457 |
| | | | 307/11 |
| 2004/0068670 A1* | 4/2004 | Suzuki | G06F 1/26 |
| | | | 713/300 |

(Continued)

OTHER PUBLICATIONS

Fabian Schiffer, Complete power management solutions for next-generation Intel Xeon processors drive superior performance and energy efficiency in data centers, Infineon Technologies AG, Market news, URL: https://www.infineon.com/cms/en/about-infineon/press/market-news/2022/INFPSS202203-066.html, dated Mar. 31, 2022, 3 pages.

*Primary Examiner* — Alfonso Perez Borroto

(57) ABSTRACT

Systems and apparatus for configurable current steering in a printed circuit board (PCB) include a plurality of power sources each including a power output, and a plurality of power loads each including a power input. A power distribution element includes a switching array configurable to selectively couple a respective power output of each of the plurality of power sources to a respective power input of each of the plurality of power loads. A controller is configured to determine that a first power load of the plurality of power loads is included in a first system configuration, and provide a control signal to the power distribution element to configure the switching array to couple a respective power output of a first power source of the plurality of power sources to a respective power input of the first power load.

20 Claims, 7 Drawing Sheets

(56) References Cited

U.S. PATENT DOCUMENTS

| | | | | |
|---|---|---|---|---|
| 2008/0290733 A1* | 11/2008 | Takahashi | ............... | H02J 9/061 |
| | | | | 307/66 |
| 2010/0091531 A1* | 4/2010 | Lum | ....................... | H02M 7/04 |
| | | | | 363/84 |
| 2013/0257153 A1* | 10/2013 | Krenz | ....................... | H02J 4/00 |
| | | | | 307/29 |
| 2016/0079859 A1* | 3/2016 | Barbosa | .................. | H02M 3/22 |
| | | | | 363/15 |
| 2016/0079881 A1* | 3/2016 | Barbosa | .................. | H02M 7/49 |
| | | | | 307/11 |
| 2016/0134125 A1* | 5/2016 | Holmberg | ............. | H02M 3/157 |
| | | | | 307/82 |
| 2016/0172862 A1* | 6/2016 | Nishigai | ................. | H02M 7/44 |
| | | | | 307/25 |
| 2017/0005480 A1* | 1/2017 | Ballantine | .................. | H02J 7/34 |
| 2019/0013679 A1* | 1/2019 | Radun | ....................... | H02J 3/36 |
| 2020/0301393 A1* | 9/2020 | Livescu | ................. | G06F 16/909 |

* cited by examiner

CONFIGURABLE CURRENT STEERING IN A PRINTED CIRCUIT BOARD

BACKGROUND

Field of the Disclosure

The field of the disclosure is data processing, or, more specifically, methods, apparatus, and systems for configurable current steering in a printed circuit board (PCB).

Description of Related Art600

A complex general purpose server may support numerous possible assembled configurations. It is difficult to optimized power distribution design and energy efficiency for all of the possible system configurations. For example, if a system PCB is power layer constrained, it can be challenging to efficiently route different power networks to different components of the system that are competing for routing space. Some systems may have thousands of signal traces, vias, keep-outs, etc. on the PCB. This often forces electrical designers to add costly PCB layers, increase copper layer thickness for power routing, or otherwise comprises power distribution efficiency to accommodate the power loads required by the different components of the system.

Existing solutions to augment power distribution paths include usage of more PCB copper layers, use of heavier copper weights requiring thicker copper planes, and/or the addition of busbar in an effort to optimize every possible hardware configuration at the same time. These existing solutions can add significant material cost and overhead to a system design, while sometimes incurring additional design space penalties. Furthermore, these solutions can lead to waste by adding power distribution elements that are not necessarily well utilized in most system configurations.

SUMMARY

Methods, apparatus, and systems for configurable current steering in a printed circuit board (PCB) according to various embodiments are disclosed in this specification. In accordance with one aspect of the present disclosure, a system includes a plurality of power sources, each power source including a power output; and a plurality of power loads, each power load including a power input. The system further includes a switching array configurable to selectively couple a respective power output of each of the plurality of power sources to a respective power input of each of the plurality of power loads. The system further includes a controller configured to determine that a first power load of the plurality of power loads is included in a first system configuration; and provide a control signal to the power distribution element to configure the switching array to couple a respective power output of a first power source of the plurality of power sources to a respective power input of the first power load.

In accordance with another aspect of the present disclosure, a method is provided for configurable current steering in a printed circuit board (PCB). The PCB comprises a power distribution element that includes a switching array configurable to selectively couple a respective power output of each of a plurality of power sources to a respective power input of each of a plurality of power loads. The method s includes determining, by a controller, that a first power load of the plurality of power loads is included in a first system configuration; and providing, by the controller, a control signal to the power distribution element to configure the switching array to couple a respective power output of a first power source of the plurality of power sources to a respective power input of the first power load.

In accordance with another aspect of the present disclosure, an apparatus includes a power distribution element including a switching array configurable to selectively couple a respective power output of each of a plurality of power sources to a respective power input of each of a plurality of power loads. The power distribution element is configured to receive a control signal from a controller to configure the switching array to couple a respective power output of a first power source of the plurality of power sources to a respective power input of a first power load. The first power load of the plurality of power loads is determined based on the first power load being included in a first system configuration.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Exemplary methods, apparatus, and systems for configurable current steering in a PCB in accordance with the present disclosure are described with reference to the accompanying drawings, beginning with FIG. 1. shows a block diagram of an example rack-mounted system configured for configurable current steering in a PCB in accordance with embodiments of the present disclosure. The example system of FIG. 1 includes a rack unit 100, such as a standard 19 inch rack for mounting multiple electronic equipment modules.

Figure 1:
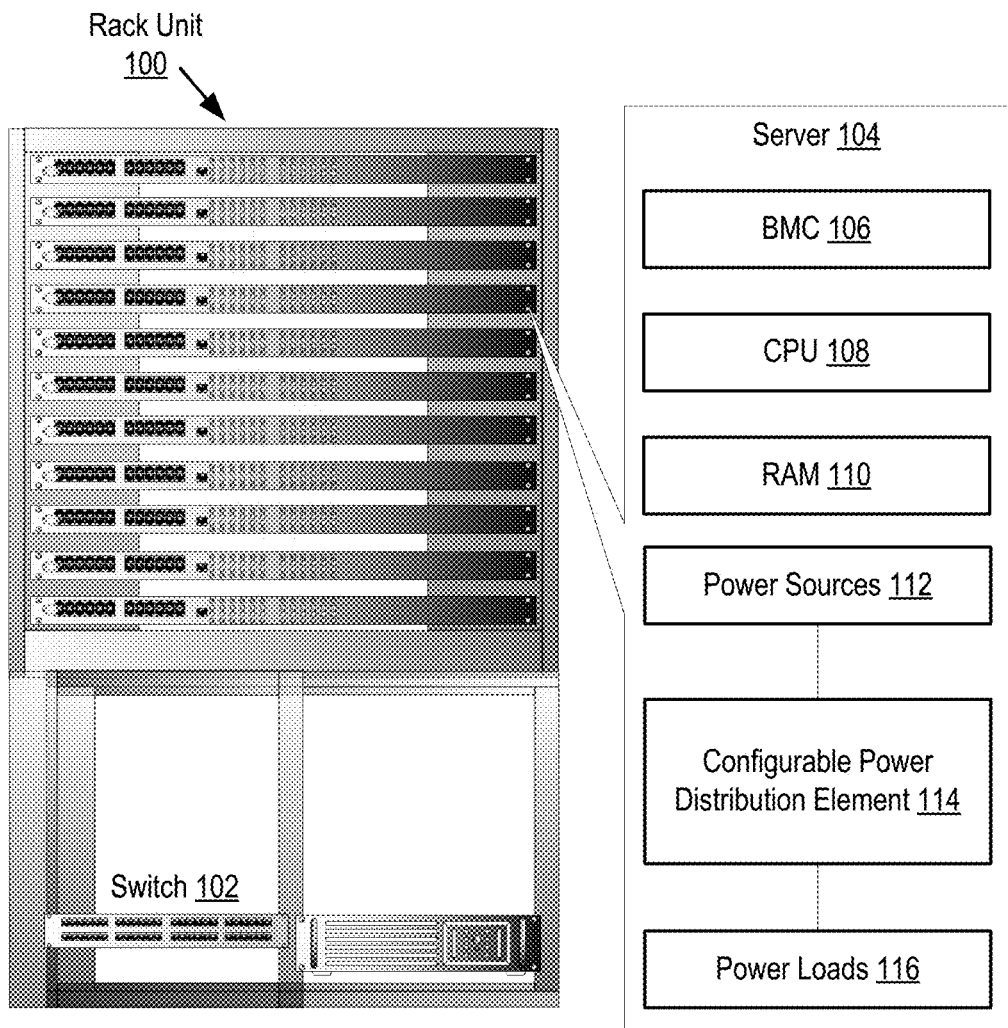
FIG. 1 shows a block diagram of an example rack-mounted system configured for configurable current steering in a PCB in accordance with embodiments of the present disclosure.

The example rack unit 100 of FIG. 1 includes a switch 102 and a server 104. The server 104 includes a baseboard management controller (BMC) 106, a CPU (central processing unit) 108, and main computer memory in the form of RAM (Random Access Memory) 110. The server 104 further includes a plurality of power sources 112, a configurable power distribution element 114, and a plurality of power loads 116. The switch 102 may be a network switch that connects components within the rack unit 100 to a computer network.

The example server 104 of FIG. 1 may be one of multiple servers included in the rack unit 100. The BMC 106 may be included within the server 104, as shown in FIG. 1, or may be positioned in the backplane of the rack unit, exterior to the server. In one embodiment, there is a BMC for each server included within the rack unit. In another embodiment, a BMC may be coupled to multiple servers of the rack unit 100.

In one or more embodiments, each of the plurality of power sources 112 is configured to provide a DC voltage to one or more of a plurality of power loads 116. In particular embodiments, one or more of the power sources 112 may be configured to provide supply a different voltage and/or current than others of the power sources. For example, a particular power source may be configured to provide a 12V DC voltage, whereas another power source may be configured to provide a 5V DC voltage. In particular embodiments, the one or more power loads 116 include components of the server 104 such as cooling fans, graphical processing units (GPUs), or storage devices (e.g., hard drives (HDDs). In one or more embodiments, the configurable power distribution element 114 is configured to selectively couple a power output of one of the power sources 112 to a power input of one of the power loads 116. In particular embodiments, one or more of the power sources 112 may also be coupled to one or more of the power loads 116 via a static power connection. In various embodiments, one or more of the BMC 106, CPU 108, RAM 110, power sources 112, configurable power distribution element 114, and power loads 116 are disposed on one or more PCBs of the server 104.

In one or more embodiments, the BMC 106 is configured to determine which of the power loads 116 is included in a particular system configuration, and provide a control signal to the configurable power distribution element to configure the configurable power distribution element 114 to couple a respective power output of a particular power source of the plurality of power sources 112 to a respective power input of a particular power load of the plurality of power loads 116. In one or more embodiments, the configurable power distribution element 114 includes a switching array including a plurality of switches configured to selectively couple particular ones of the plurality of power sources 112 to particular ones of the power loads 116 as further described herein.

In various embodiments, a method is provided for configuring a system's power distribution elements (such as PCB copper paths, busbars, connectors, a PCB shape corridor, etc.) according to a specific system configuration, thereby reducing system cost and/or improving system energy efficiency. In particular embodiments, the switching array includes an array of power metal-oxide-semiconductor field-effect transistors (MOSFETs) to switch in and out different power sources to any of n power distribution elements. The power MOSFETs steer power to specific distribution elements as needed to support an optimum power distribution network for a given system configuration.

Figure 2:
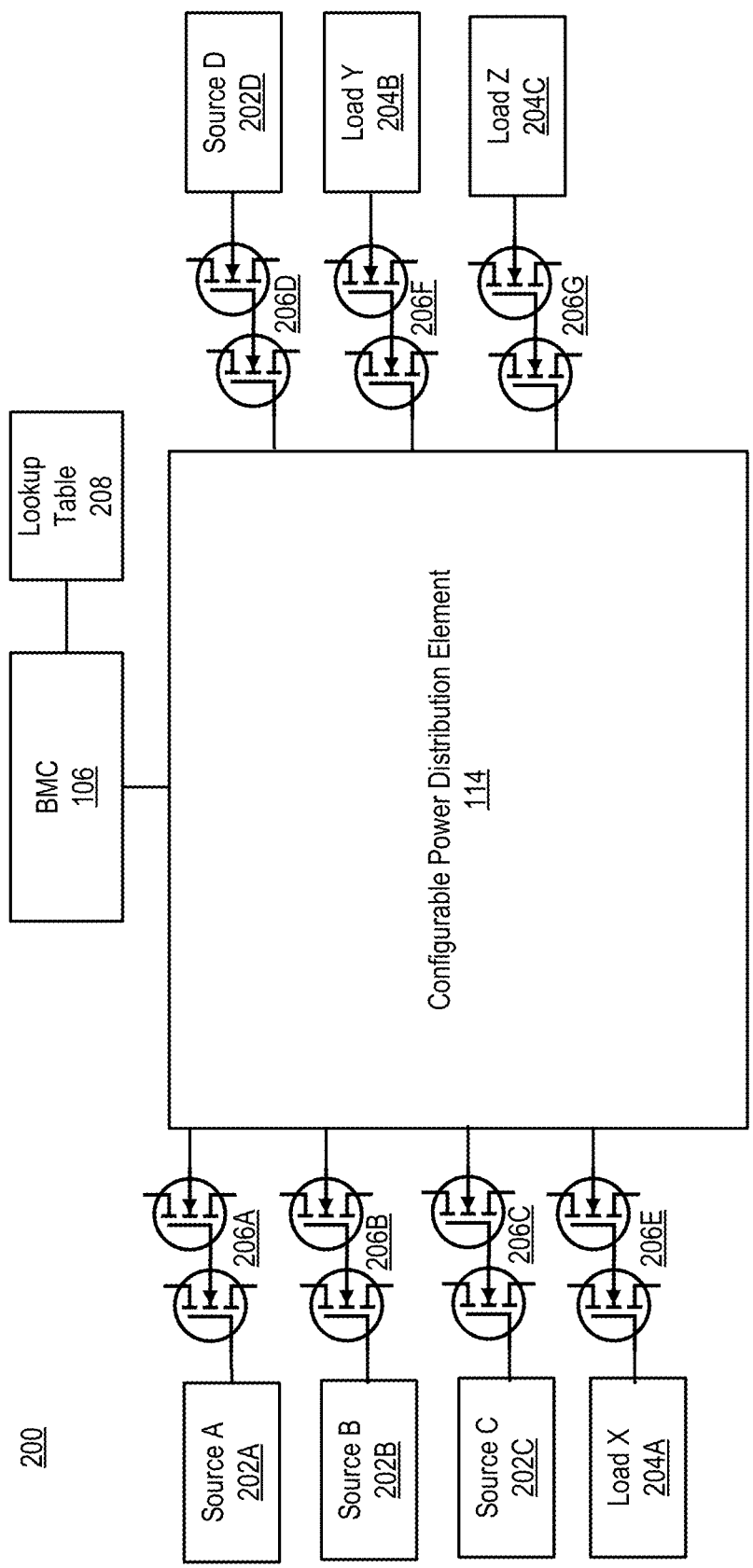
FIG. 2 shows a block diagram of another example system configured for configurable current steering in a PCB in accordance with embodiments of the present disclosure.

For further explanation, FIG. 2 shows a block diagram of another example system 200 configured for configurable current steering in a PCB in accordance with embodiments of the present disclosure. The system 200 includes the configurable power distribution element 114 in communication with the BMC 106. A power output of a power source A 202A is selectively coupled to the configurable power distribution element 114 via a first switching device 206A, a power output of a power source B 202B is selectively coupled to the configurable power distribution element 114 via a second switching device 206B, a power output of a power source C 202C is selectively coupled to the configurable power distribution element 114 via a third switching device 206C, and a power output of a power source D 202D is selectively coupled to the configurable power distribution element 114 via a fourth switching device 206D. A power input of a power load X 204A is selectively coupled to the configurable power distribution element 114 via a fifth switching device 206E, a power input of a power load Y 204B is selectively coupled to the configurable power distribution element 114 via a sixth switching device 206F, and a power input of a power load Z 204C is selectively coupled to the configurable power distribution element 114 via a seventh switching device 206G. In one or more embodiments, the switching devices 206A-206G comprise a switching array of the configurable power distribution element 114. In particular embodiments, one or more of the switching devices 206A-206G comprise one or more switching transistors such as MOSFETs.

In various embodiments, each of the power sources 202A-202D is configured to provide a supply voltage and a supply current to a power load of the system 200 such as one or more of power loads 204A-204C. In particular embodiments, one or more of the power sources 202A-202D comprise power sources such as source power received from voltage regulators, power supplies, and overcurrent protection circuitry. In particular embodiments one or more of the power loads 204A-204C are components of the system 200 such as cooling devices (e.g., fans), GPUs, storage devices (e.g., HDDs). In various embodiments, one or more of the power loads 204A-204C are optional loads that vary in power requirement depending upon a given installed system configuration and/or workload.

In an embodiment, the configurable power distribution element 114 is configured to bridge a connection from one or more of the powers sources 202A-202D to one or more power loads 204A-204C according to the status of the switching devices 206A-206G (e.g., power MOSFETs) connected to the configurable power distribution element 114. In an embodiment, the configurable power distribution element 114 supplements other static power distribution elements in the system or serves as a unique bridge between source and load. In other embodiments, the configurable power distribution element 114 may comprise any one of many possible power distribution elements in a more complex network arrangement.

In an embodiment, the configurable power distribution element 114 is configurable to selectively couple a respective power output of each of the plurality of power sources 202A-202D to a respective power input of each of the plurality of power loads 204A-204C via the switching array. In an embodiment, the BMC 106 is configured to determine that a first power load of the plurality of power loads 204A-204C is included in a first system configuration, and provide a control signal to the configurable power distribution element 114 to configure the switching array to couple a respective power output of a first power source of the plurality of power sources to a respective power input of the first power load. Although various embodiments herein are described with respect to the BMC 106 controlling the configuration of the configurable power distribution element, in other embodiment other suitable controllers are used such as a field programmable gate array (FPGA) or other suitable logic circuitry.

In an embodiment, the BMC 106 is configured to determine the first power source based on an association of the first power source, the first power load, and the first system configuration. In another embodiment, a lookup table 208 stores the association of the first power source, the first power load, and the first system configuration and the BMC 106 determines the configuration of the switching array by referencing the lookup table 208. In one or more embodiments, the lookup table 208 stores a status (e.g., open or closed) of each of the switching devices 206A-206G to satisfy the requirements of a particular system configuration. In a particular embodiment, the lookup table 208 is used to determine a MOSFET status of each of the MOSFETs of the switching array that is best for a given system configuration. In an example system configuration, if a customer has purchased a server with GPUs, but no or fewer HDDs, the configurable power distribution element 114 is assigned to provide a supplemental pathway for GPU power. For example, if power load X 204A includes HDDs, power load Y 204B includes cooling fans, and power load Z 204C includes GPUs, the configurable power distribution element 114 may be configured to connect power source A 202A to power load Z 204C, thereby saving energy for the customer and reducing operation costs. In another example system configuration, another customer with a storage optimized system configuration may have the configurable power distribution element 114 configured to connect power source D 202D to power load X 204A instead. Accordingly, various embodiments provide for reappropriating unconnected or underutilized power distribution elements that service unused or light loads for better utilization. The PCB power distribution itself becomes a configurable element.

Figure 3:
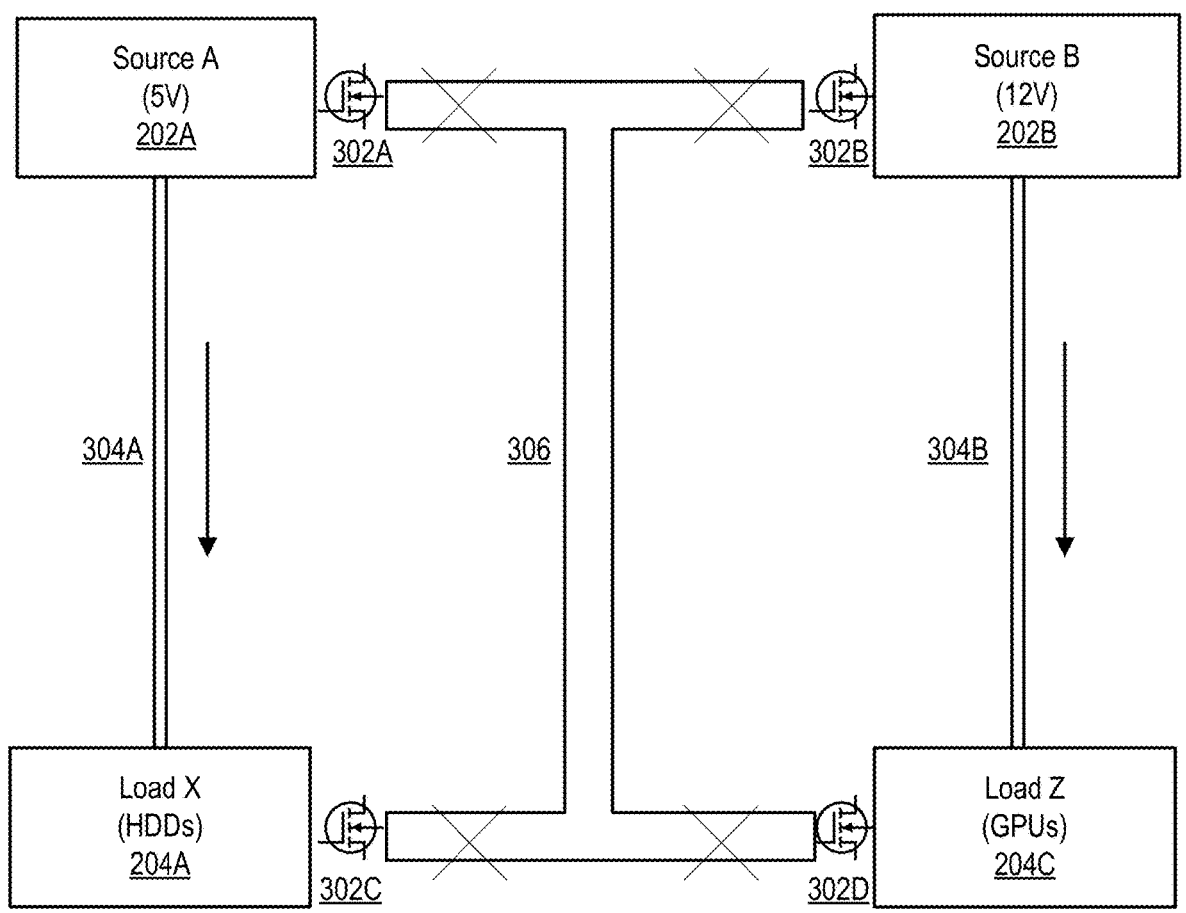
FIG. 3 shows a block diagram of a first configuration of an example system configured for configurable current steering in a PCB in accordance with embodiments of the present disclosure.

For further explanation, FIG. 3 shows a block diagram of a first configuration 300 of an example system configured for configurable current steering in a PCB in accordance with embodiments of the present disclosure. In the first configuration 300, the power source A 202A and the power source B 202B are coupled to a configurable power delivery element 306 via a first switching device 302A and a second switching device 302B, respectively. The power load X 204A and the load Z 204C are coupled to the configurable power delivery element 306 via a third switching device 302C and a fourth switching device 302D, respectively. In the example of FIG. 3, the power source A 202A is a 5V source for HDDs included as the power load X 204A, and the power source B 202B is a 12V source for GPUs included as the load Z 204C. The power source A 202A has modestly sized static connection 304A (e.g., a PCB copper connection) to the power load X 204A, and the power source B 202B has a modestly sized static connection 304B (e.g., a PCB copper connection) to the power load Z 204C. However, on the specific PCB, the number of layers and routing space is limited. The space needed for the copper used by the power delivery is limited, and power loads compete with each other for copper availability. In addition, the power delivery also competes for space with other components on the PCB.

In the example of FIG. 3, the PCB includes only enough room to route one large copper channel embodying the configurable power delivery element 306. In the example of FIG. 3, no configuration of the configurable power delivery element 306 is currently selected such that all of the switching devices 302A-302D are open and none of the power source A 202A, the power source B 202B, the power load X 204A, or the power load Z 204C are currently coupled to the configurable power delivery element 306. Accordingly, prior to selection the configurable power delivery element 306 is unassigned and not conducting power from any power source to any power load. Instead, the power source A 202A provides a supply current to the power load X 204A only by the static connection 304A, and the power source B 202B provides a supply current to the power load Z only by the static connection 304B. To deliver power efficiently to the power loads, the configurable power delivery element 306 is selected to either connect power source A 202A to power load X 204A (see FIG. 4), or connect power source B 202B to power load Z 204C (see FIG. 5).

Figure 4:
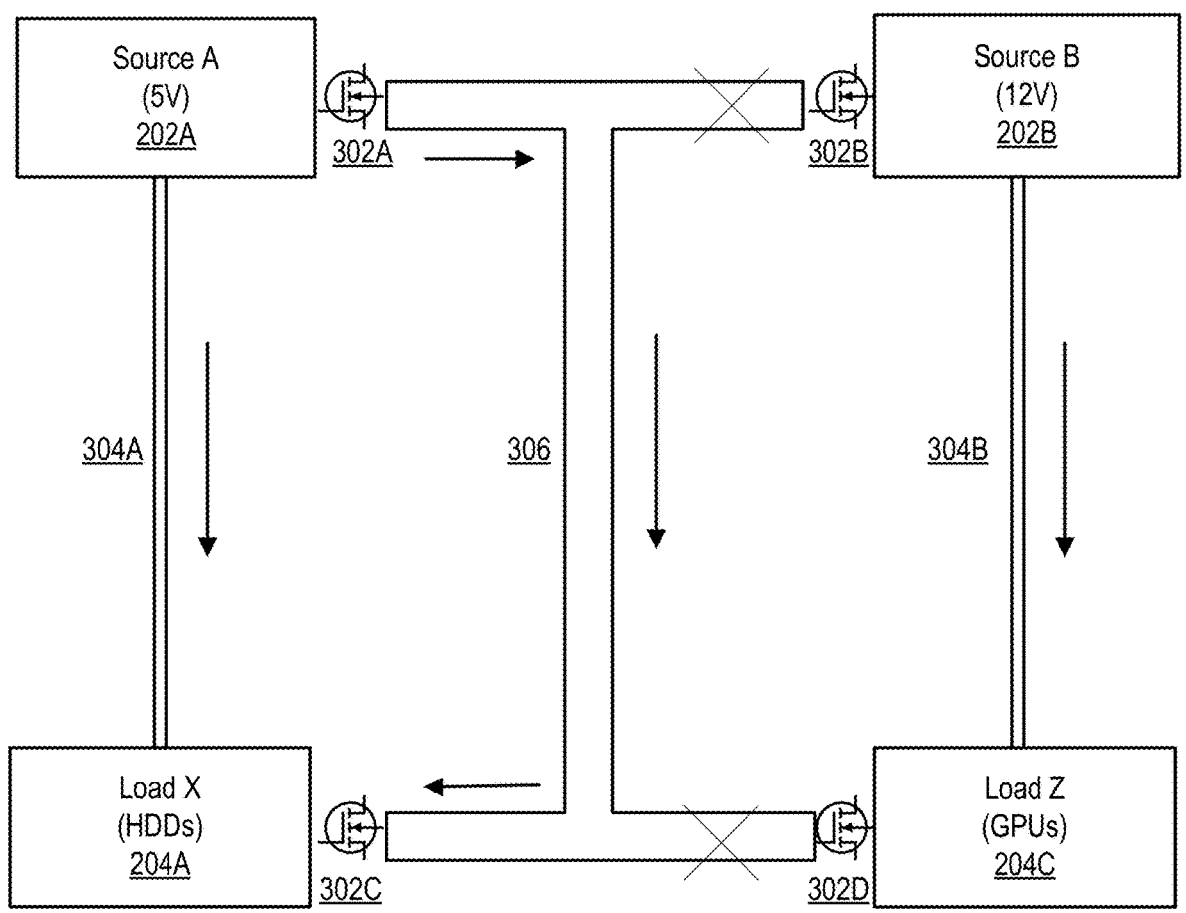
FIG. 4 shows a block diagram of a second configuration of an example system configured for configurable current steering in a PCB in accordance with embodiments of the present disclosure.

For further explanation, FIG. 4 shows a block diagram of a second configuration 400 of an example system configured for configurable current steering in a PCB in accordance with embodiments of the present disclosure. In some embodiments, the configurable power delivery element 306 is utilized when either load X 204A or load Z 204C contains devices that require more current than what static connection 304A or static connection 304B can provide, but for which running load X 204A and load Z 204C at a high current level is mutually exclusive. In other words, for situations in which load X 204A and load Z 204C cannot both be operating which higher current at the same time. In some embodiments, the configurable power delivery element 306 is utilized to configure an extra pathway to route the high current to either load X 204A or load Z 204C. In the second configuration 400 of the example system, the example system has no or few GPUs installed, but there are one or more HDDs installed. In the example configuration, the first switching device 302A and third switching device 302C are each closed to couple the power source A 202A to the power load X 204A via the configurable power delivery element 306. The second switching device 302B and the fourth switching device 302D are open thereby disconnecting the power source B 202B and the power load Z 204C from the configurable power delivery element 306. Accordingly, a supply current is delivered from the power source A 202A to the power load X 204A via both the static connection 304A and the configurable power delivery element 306. If any supply current is required to be provided to the power load Z 204C from the power source B 202B, the power source B 202B provides the supply current to the power load Z 204C only via the static pathway provided by static connection 304B.

Figure 5:
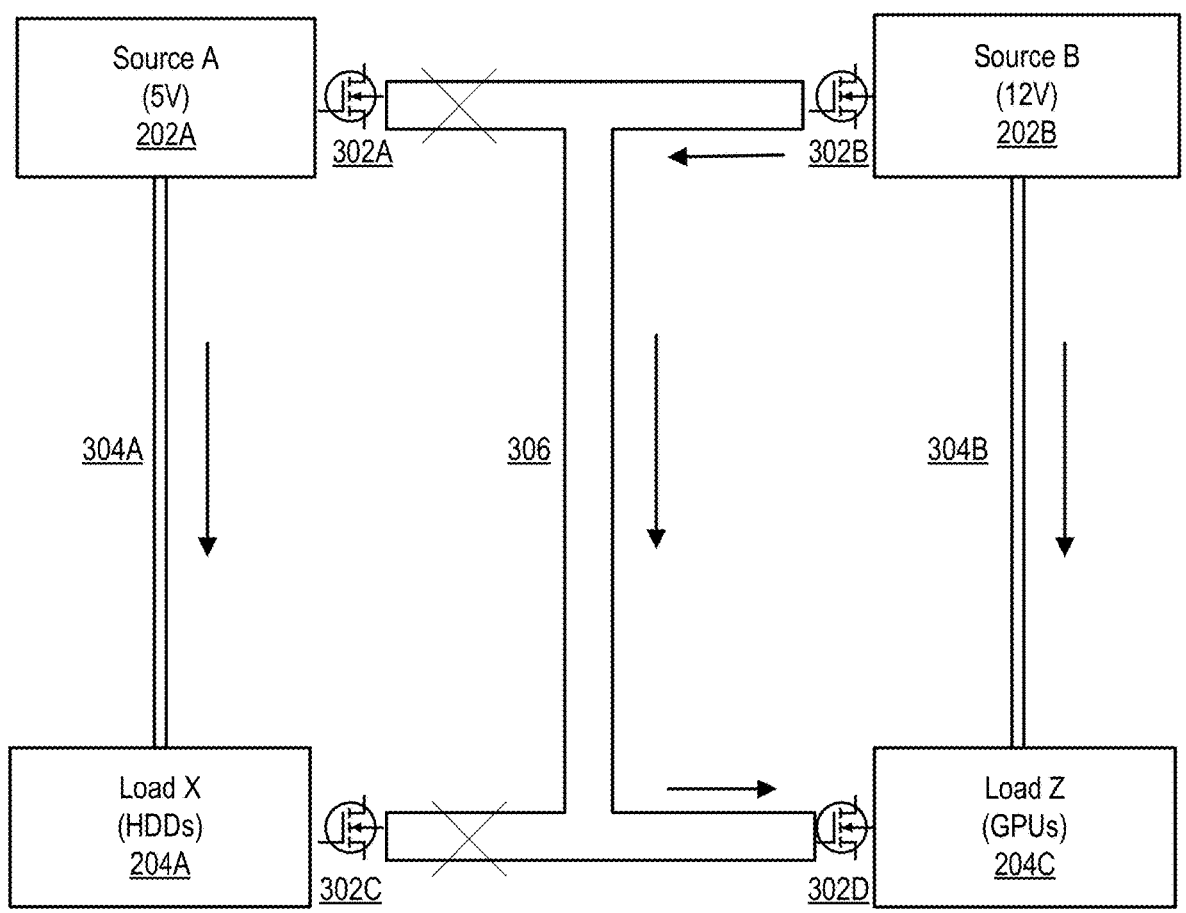
FIG. 5 shows a block diagram of a third configuration of an example system configured for configurable current steering in a PCB in accordance with embodiments of the present disclosure.

For further explanation, FIG. 5 shows a block diagram of a third configuration 500 of an example system configured for configurable current steering in a PCB in accordance with embodiments of the present disclosure. In the third configuration 500 of the example system, the example system is dominated by GPUs, and the configurable power delivery element 306 is selected to augment the GPU power delivery path instead. In the example configuration, the first switching device 302A and the third switching device 302C are each open to decouple the power source A 202A and the power load X 204A from the configurable power delivery element 306. The second switching device 302B and the fourth switching device 302D are each closed to couple the power source B 202B and the power load Z 204C to the configurable power delivery element 306. Accordingly, a supply current is delivery from the power source B 202B to the power load Z 204C via both the configurable power delivery element 306 and the static connection 304B. If any supply current is required to be provided to the power load X from the power source A 202A, the power source A 202A provides the supply current to the power load X 204A only via the static pathway provided by the static connection 304A. By appropriate selection of the assignment of the configurable power delivery element, the power dissipation in the total power delivery paths to the HDDs and the GPUs is reduced and system efficiency is maximized. In certain embodiments, extra copper is selected to increase the maximum number of load elements that can be supported.

Figure 6:
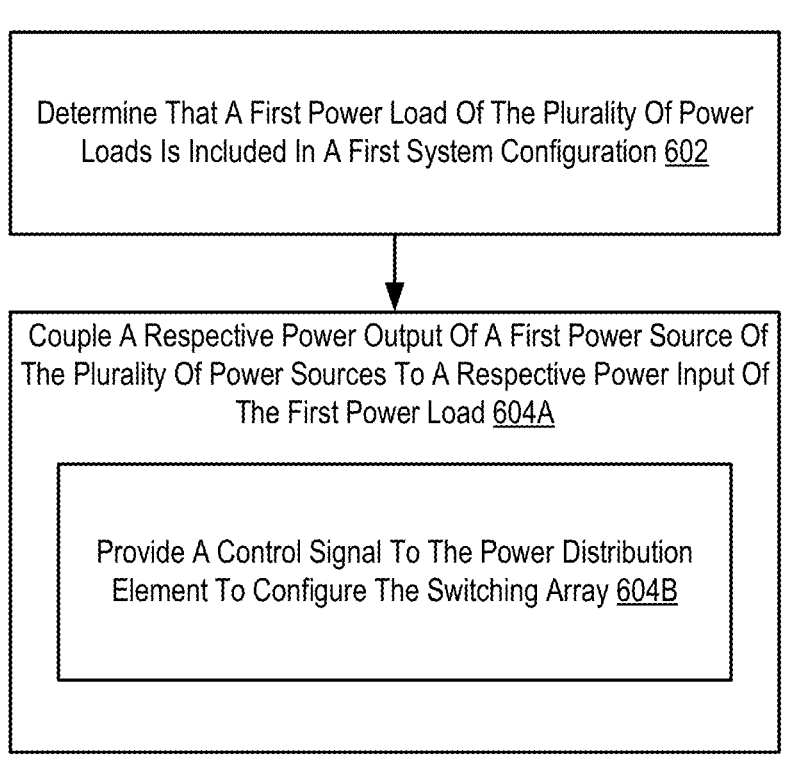
FIG. 6 is a flowchart of an example method for configurable current steering in a PCB according to some embodiments of the present disclosure.

For further explanation, FIG. 6 sets forth a flowchart illustrating an example method 600 for configurable current steering in a PCB according to some embodiments of the present disclosure. The PCB comprises a power distribution element that includes a switching array configurable to selectively couple a respective power output of each of a plurality of power sources to a respective power input of each of a plurality of power loads. In particular embodiments, one or more of the power sources may be configured to provide supply a different voltage and/or current than others of the power sources. For example, a particular power source may be configured to provide a 12V DC voltage whereas another power source may be configured to provide a 5V DC voltage. In particular embodiments, the one or more power loads include components of a computing system (e.g., a server) such as cooling fans, GPUs, or storage devices (e.g., HDDs).

In some embodiments, the power distribution element comprises the configurable power distribution element 114. In some embodiments, the power distribution element is disposed on the PCB. In particular embodiments, the power distribution element comprises at least one of a conductive path, a busbar, or a connector. In some embodiments, the switching array comprises a plurality of switching devices. In particular embodiments, one or more of the plurality of switching devices comprises a transistor. In a particular embodiment, the transistor comprises a MOSFET.

The method 600 includes determining 602, by a controller, that a first power load of the plurality of power loads is included in a first system configuration. In some embodiments, the controller determines the first power source based on an association of the first power source, the first power load, and the first system configuration. In particular embodiments, the association of the first power source, the first power load, and the first system configuration is stored in a lookup table. In a particular embodiment, the controller comprises a BMC.

The method 600 further includes coupling 604A a respective power output of a first power source of the plurality of power sources to a respective power input of the first power load. The coupling is performed by providing 604B, by the controller, a control signal to the power distribution element to configure the switching array to couple the respective power output of the first power source of the plurality of power sources to the respective power input of the first power load. In particular embodiments, one or more of the power sources may also be coupled to one or more of the power loads via a static power connection. In various embodiments, one or more of the controller, the power sources, the power distribution element, and the power loads are disposed on one or more PCBs of the computing system.

Figure 7:
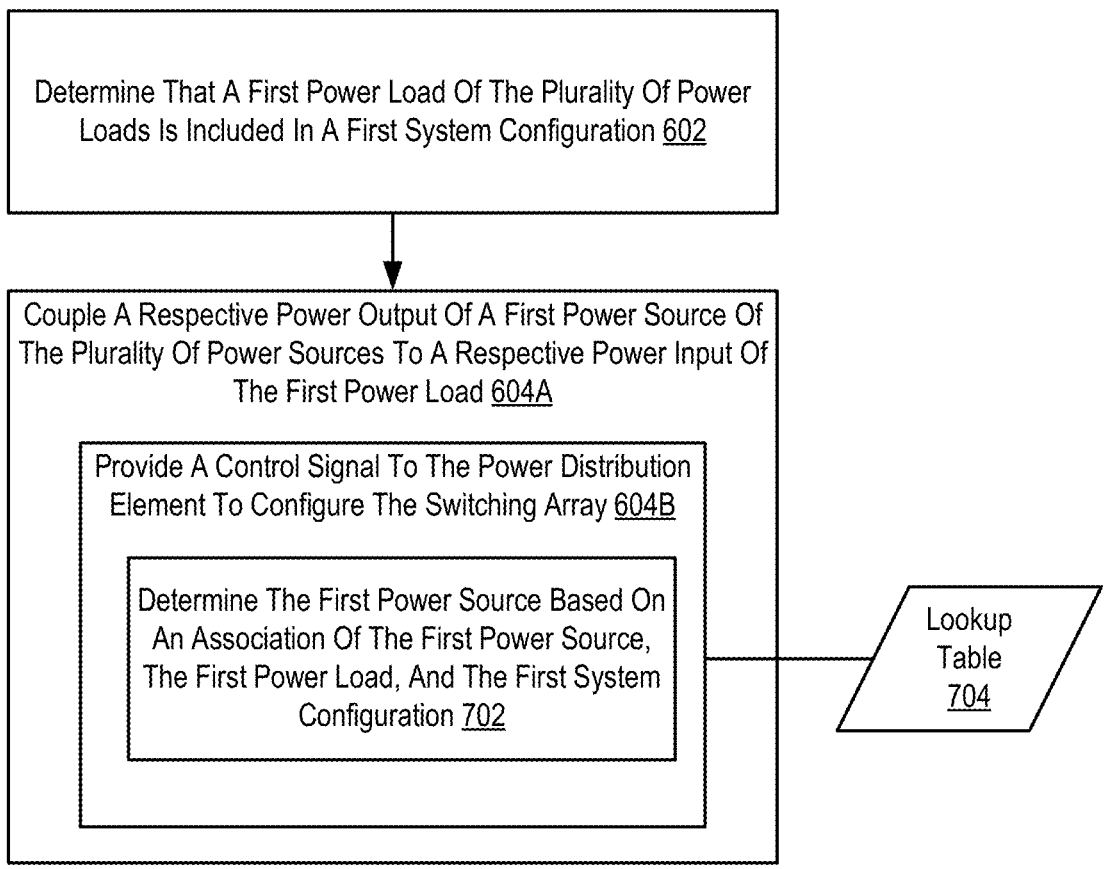
FIG. 7 is a flowchart of an example method for configurable current steering in a PCB according to some embodiments of the present disclosure.

For further explanation, FIG. 7 sets forth a flowchart illustrating an example method 700 for configurable current steering in a PCB according to some embodiments of the present disclosure. The method of FIG. 7 continues with the method of FIG. 6 by further including, as part of providing 604B, by the controller, a control signal to the power distribution element to configure the switching array, determining 702 the first power source based on an association of the first power source, the first power load, and the first system configuration. In a particular embodiment, the association of the first power source, the first power load, and the first system configuration is stored in a lookup table 704.

In view of the explanations set forth above, readers will recognize that the benefits of configurable current steering in a printed circuit board (PCB) according to embodiments of the present disclosure include reduced system costs; improved system energy efficiency; improved PCB space utilization; and others as will occur to readers of skill in the art.

The flowchart and block diagrams in the Figures illustrate the architecture, functionality, and operation of possible implementations of systems, methods, and apparatus according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A system comprising:
    a plurality of power sources, each power source including one or more power-supplying devices and including a power output;
    a plurality of power loads, each power load including a power input, wherein each power load includes one or more power-consuming computing components included in a computing system;
    a plurality of static power paths, each static power path between respective ones of the plurality of power sources and the plurality of power loads;
    a power distribution element separate from the plurality of static power paths;
    a switching array configurable to selectively couple at any given time the power output of at most one power source of the plurality of power sources to the power input of at most one power load of the plurality of power loads via the power distribution element; and
    a controller in the computing system configured to:
        determine that a first power load of the plurality of power loads is included in a first system configuration; and
        provide a control signal to the switching array to cause the power output of a first power source of the plurality of power sources and the power input of the first power load to both be coupled to the power distribution element.

2. The system of claim 1, wherein the controller is separate from the power distribution element and is further configured to determine the first power source based on an association of the first power source, the first power load, and the first system configuration.

3. The system of claim 2, wherein the association of the first power source, the first power load, and the first system configuration is stored in a lookup table.

4. The system of claim 1, wherein the power distribution element is disposed on a printed circuit board (PCB).

5. The system of claim 1, wherein the power distribution element comprises at least one of a conductive path, a busbar, or a connector.

6. The system of claim 1, wherein the switching array comprises a plurality of switching devices.

7. The system of claim 6, wherein one or more of the plurality of switching devices comprises a transistor.

8. The system of claim 1, wherein the first power source is configured to supply first power having a first voltage level, and wherein a second power source of the plurality of power sources is configured to supply second power having a second voltage level that is different from the first voltage level.

9. The system of claim 1, wherein the controller is configured to cause the power distribution element to deliver power is supplemental to power supplied by one of the static power paths.

10. The system of claim 1, wherein the controller is configured provide a separate control signal to the switching array to cause the power output of a second power source of the plurality of power sources and the power input of a second power load of the plurality of power loads to be isolated from the power distribution element.

11. The system of claim 1, wherein the controller comprises a baseboard management controller (BMC).

12. A method for configurable current steering in a printed circuit board (PCB), the PCB included in a computing system and comprising a plurality of static power paths between respective ones of a plurality of power sources and a plurality of power loads, the PCB also comprising a power distribution element that includes a switching array configurable to selectively couple at any given time a power output of at most one power source of the plurality of power sources to a power input of at most one power load of the plurality of power loads, the method comprising:

determining, by a controller in the computing system, that a first power load of the plurality of power loads is included in a first system configuration; and providing, by the controller, a control signal to the switching array to cause the power output of a first power source of the plurality of power sources and the power input of the first power load to both be coupled to the power distribution element.

13. The method of claim 12, further comprising determining the first power source based on an association of the first power source, the first power load, and the first system configuration.

14. The method of claim 13, wherein the association of the first power source, the first power load, and the first system configuration is stored in a lookup table.

15. The method of claim 12, wherein the switching array comprises a plurality of switching devices.

16. The method of claim 15, wherein one or more of the plurality of switching devices comprises a transistor.

17. An apparatus comprising:

a power distribution element including a switching array configurable to selectively couple at any given time a power output of at most one power source of a plurality of power sources to a power input of at most one power load of a plurality of power loads, wherein:

the power distribution element is structurally and electrically separate from static power paths between respective ones of the plurality of power sources and the plurality of power loads;

the power distribution element is configured to receive a control signal from a controller to configure the switching array to cause the power output of a first power source of the plurality of power sources and the power input of the first power load to both be coupled to the power distribution element; and the first power load of the plurality of power loads is determined based on the first power load being included in a first system configuration.

18. The apparatus of claim 17, wherein the switching array comprises a plurality of switching devices.

19. The apparatus of claim 18, wherein one or more of the plurality of switching devices comprises a transistor.

20. The apparatus of claim 19, wherein the transistor comprises a metal-oxide-semiconductor field-effect transistor (MOSFET).

* * * * *